United States Patent [19]
Ieda

[11] Patent Number: 6,045,051
[45] Date of Patent: Apr. 4, 2000

[54] INTEGRATED THERMOSTAT

[75] Inventor: Joao Jose Cardinali Ieda, Sao Paulo, Brazil

[73] Assignee: Wahler Metalurgica Ltda., Brazil

[21] Appl. No.: 09/040,893

[22] Filed: Mar. 18, 1998

[30]    Foreign Application Priority Data

Mar. 20, 1997 [BR] Brazil ................................. 7700267 U

[51] Int. Cl.[7] ...................................................... F01P 7/16
[52] U.S. Cl. ........................................... 236/34.5; 236/34
[58] Field of Search ..................................... 236/34, 34.5

[56]               References Cited

U.S. PATENT DOCUMENTS

| | | | |
|---|---|---|---|
| 2,729,395 | 1/1956 | Watkins ...................................... | 236/34 |
| 4,913,101 | 4/1990 | Sliger . | |
| 4,930,455 | 6/1990 | Creed et al. . | |
| 5,163,613 | 11/1992 | Ragan ...................................... | 236/34.5 |
| 5,292,064 | 3/1994 | Saur et al. ............................... | 236/345 |
| 5,447,271 | 9/1995 | Kumze et al. .......................... | 236/34.5 |

FOREIGN PATENT DOCUMENTS 2339117   8/1977   France ................................... 236/34.5

*Primary Examiner*—Henry Bennett
*Assistant Examiner*—Melvin Jones
*Attorney, Agent, or Firm*—Ostrolenk, Faber, Gerb & Soffen, LLP

[57]                 ABSTRACT

A cover/case similar to an already known model or plastic form is used, of the type defined by an inlet conduit (1) with access to the compartment (2) for positioning the thermostatic valve, and having an opening region in which there is configured a coupling flange (4) with holes (5) for fixing screws at the point of linking the radiator hose to the engine. The cover/case also includes certain improvements over those previously known, including the molding of a central cylindrical projection (8) on the compartment apex (2) and having a hole (10) at its distal tip for centralization of the thermostatic valve assembly, the molding of a ring section (11) on the flange inferior face circumscribing the compartment (2) opening and having a channel (12) on its peripheral border for lodging the sealing ring, the molding of two perpendicularly designed legs (13) in the internal border of the ring section (11) and on two diametrically opposed sides, and which are provided with a slot (14) where the sustaining arch (20) of the thermostatic valve is fixed in order to effect integration of the valve to the cover/case, and having, on the ring section (11) base, a seat (15) for installation of the ball-valve (16), which has communication with the inlet conduit (1).

9 Claims, 2 Drawing Sheets

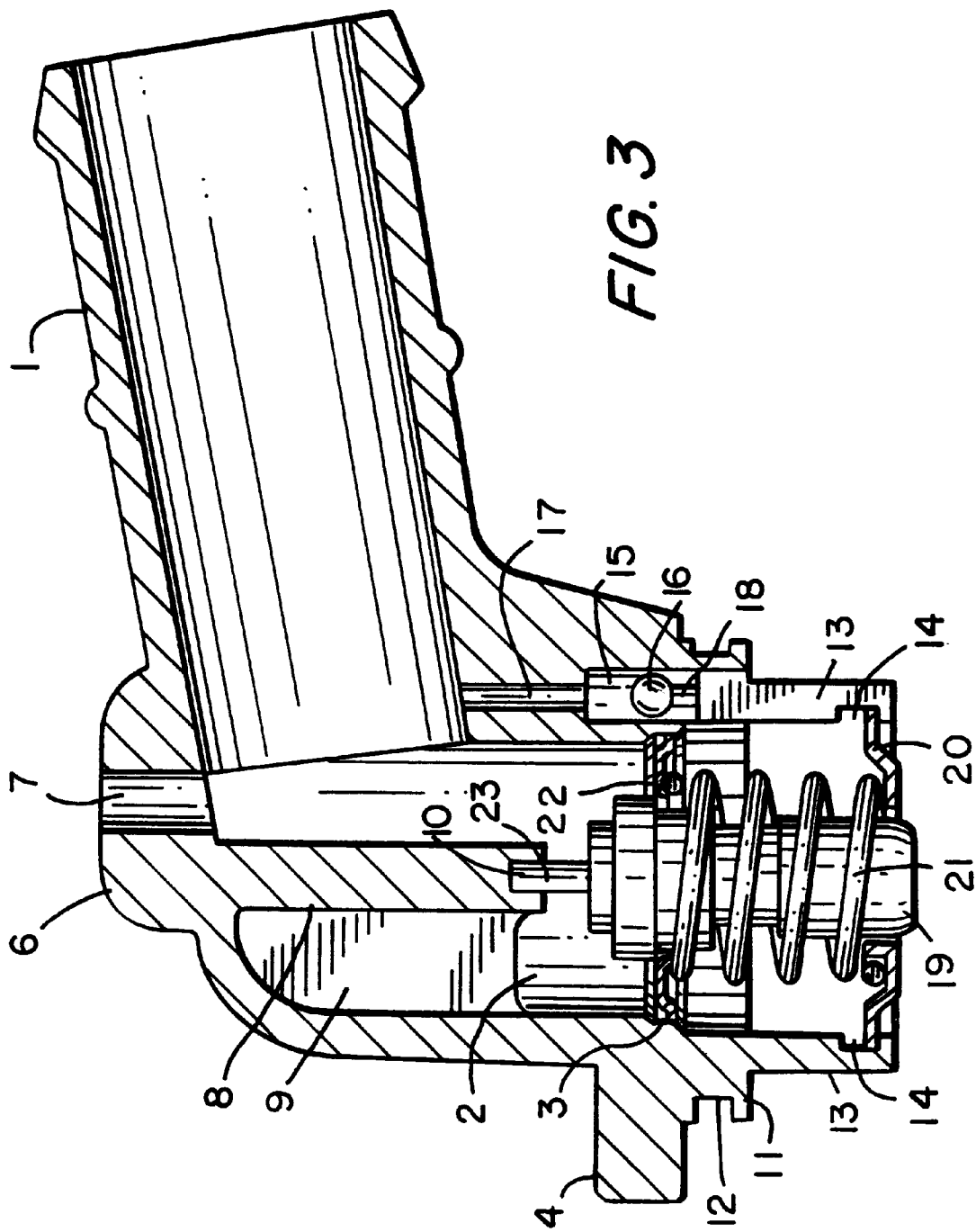

INTEGRATED THERMOSTAT

BACKGROUND OF THE INVENTION

1. Field of the Invention

This utility model patent refers to an Integrated Thermostat used in the automobile industry, and which consists of important improvements which allow to unite in a single set the cover/case and the thermostatic valve, in order to offer a series of technical, practical, functional, efficient and economical advantages, thus allowing the minimization of manufacturing costs, workmanship and assembly time.

2. Brief Description of the Related Art

The use of a cover/case is already known in a thermostatic valve casing system. The cover/case is provided independently from the thermostatic valve, thus requiring more complicated and slower assembly operations for the said thermostatic valve, implying not only an increase in time and workmanship, but also an increase in costs, as well as depending too much on special attention, in order to obtain the required precision in the cover/case of the thermostatic valve assembly. Even so, most of the time the required precision is not achieved, thus negatively contributing to the set performance, with occasional damages to the engine functioning.

SUMMARY OF THE INVENTION

The integrated thermostat herein proposed eliminates all problems and inconveniences presented by the conventional system. The main novelty, although based on an already known model of a casing, is in the conception of a product which integrates in a single unit the cover/case and the thermostatic valve, with real possibilities for economical industrialization, reduction of costs, assembly time and workmanship costs, thus substantially easing the assembly in the automobile industry and obtaining a total precision effect, with the best results and high safety standards.

The casing used by the Integrated Thermostat herein proposed, as above-mentioned, is similar to an already known model or plastic form of the type defined by an inlet conduit linked to the part body, which is trough in order to constitute a compartment for accommodating the thermostatic valve and in which an opening with a conical or rifled edge, has a configured oblong coupling flange with holes for the passage of the screws for fixing the case to the housing exiting at the point of linking the radiator hose to the engine.

One of the novelties of the present invention refers to the modification of the compartment internal configuration, in order to provide it with elements which allow the rigorously precise integration of the thermostatic valve, in a different and much more practical, rapid, easy and economical form, resulting in a single unit.

Another novelty of the present invention is connected to making a lodging which communicates with the inlet conduit, for installation of a ball-valve used to de-aerate the system, effectively contributing to, and guaranteeing the perfect set functioning.

Another introduced novelty refers to the conception of a channel for placing a sealing element.

BRIEF DESCRIPTION OF THE DRAWINGS

In order to provide a clear view of the Integrated Thermostat in question, the illustrative drawings are attached hereto, to which references are made in order to better elucidate the following detailed description, and it should be explained that the model or plastic form of the represented cover/case, as well as the thermostatic valve set, do not constitute characterization elements to the present utility model except for the fact that the elements of the thermostatic valve set casing have been fully molded to the said cover/case.

FIG. 3 represents the side view in cross-section for better understanding, having the sustaining legs of the thermostatic valve showed in a position turned 45° in relation to the linear position of the inlet set.

DETAILED DESCRIPTION OF THE PREFERRED EMBODIMENT

Figure 1:
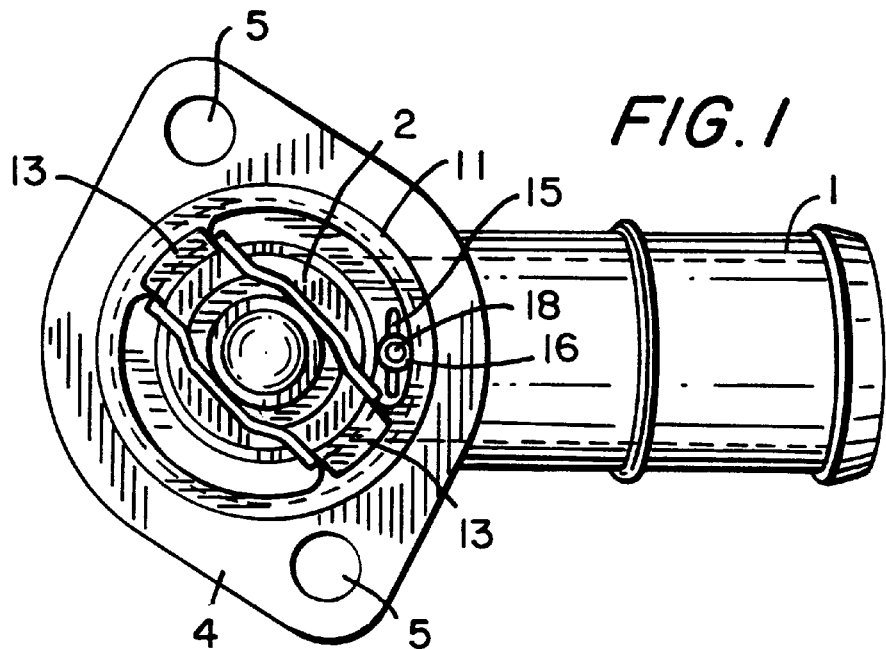
FIG. 1 represents the bottom view of the cover/case with the improved modifications introduced in accordance with the present invention.
Figure 2:
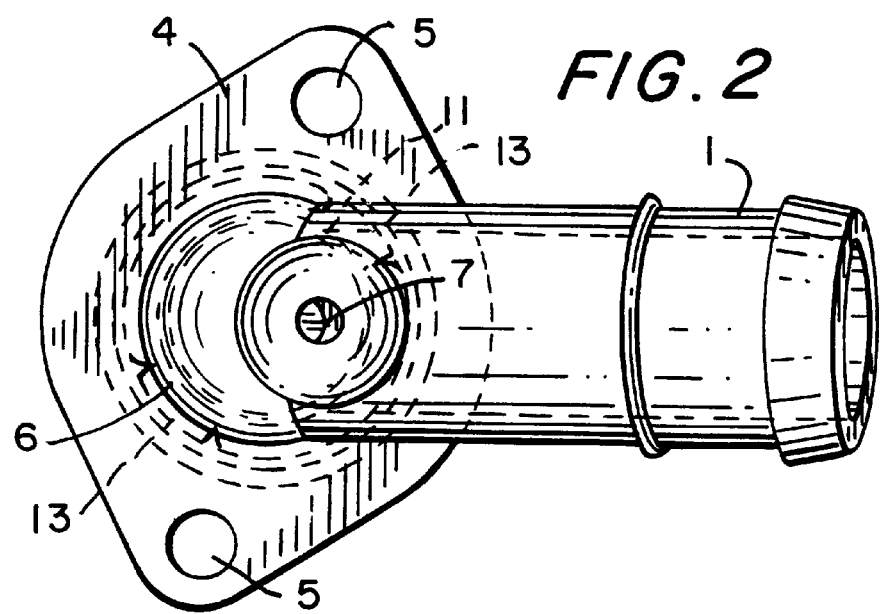
FIG. 2 represents the top view of the cover/case of FIG. 1.

The Integrated Thermostat herein proposed uses a cover/case similar to an already known model or plastic form, of the type provided with an inlet conduit (1) which gives access to the compartment (2) for the positioning the thermostatic valve, and in which an opening portion, with a conical (3) or rifled edge has a configured oblong coupling flange (4) with holes (5) for the passage of screws for fixing the cover/case to the lodging exiting at the point of linking the radiator hose to the engine, and having at the body top (6) the hole (7) for the installation of the de-aeration valve.

In accordance with the attached illustrations and its particularities, the Integrated Thermostat herein proposed is essentially characterized by a cylindrical projection (8) reinforced by a radial ribbed wall (9), with a non-passing hole on the end, centrally assembled on the compartment apex (2); a ring section (11) molded on the inferior face of the coupling flange (14) and circumscribing the compartment (2) opening in which peripheral border there is a channel shaped to receive a scaling ring; two perpendicularly designed legs (13), each having near their ends and on the confronting faces, a transversal slot (14) molded to the internal border of the ring section (11) and to two diametrically opposed sides, wherein the two legs (13) may be positioned along a line turned 450 in relation to the linear positioning of the inlet conduit (1), or in other angles; and a seat 15, provided from the ring section (11) base, for the installation of a ball-valve (16), and which has communication with the inlet conduit (1) of the cover/case through a narrow channel (17), wherein the ball-valve (16) is retained in its seat by means of diametrically placed filament (18) with ends nailed to the ring section (11) structure.

The thermostatic valve set is composed by the working element or temperature sensor (19), the sustaining arch (20) constituted by a printed plate with its edges folded in an elevated plan, and the pressure coil spring (21).

Such working element (19) has a peripheral tab (22) linked to one end, which defines the sealing element and cooling liquid passage control, and which may be of rubber. In that same end, the working element has, at the tip, a centralization pin (23) to be lodged into the hole (10) provided in the cylindrical projection point (8) molded to the apex of the cover/case compartment (2).

The working element (19) is subject to the coil (21) action, such coil being supported on one side under the peripheral tab (22) and, oppositely, on the sustaining arch (20), the edges of which are locked in the transversal slots (14) provided on the confronting faces of the projected legs (13) of the ring section (11) inferior face of the cover/case (see FIG. 3). Thus, the thermostatic valve set is fixed to the said cover/case in an unified manner, while also allowing the element to be interchangeable, if so required.

Thus, the Integrated Thermostat of the present invention perfectly integrates the cover/case with the thermostatic valve, thus generating an innovative technology in the automobile industry, so as to fully satisfy the proposed objectives and to carry out the destined functions in a practical and efficient manner, having its own characteristics and being provided with fundamental novelty requirements.

I claim:

1. An integrated thermostat comprising:

a unitary casing including an inlet conduit, a compartment in fluid communication with the inletconduit and having a proximal portion and a distal opening, a cylindrical projection integrally formed with the casing at the proximal portion of the compartment and extending coaxially with the compartment, the cylindrical projection having a distal end, a coupling flange formed around the distal opening of the compartment, two legs depending distally from the compartment opening to respective distal ends, each leg having an inward surface and a transverse slot formed on its respective inward surface near the distal end thereof, a ball-valve disposed in the ball-valve seat, a ball-valve seat formed near the distal opening of the compartment, a narrow channel providing fluid communication between the ball-valve seat and the inlet conduit; and a thermostat valve assembly including a temperature sensing unit having a proximal end affixed to the distal end of the cylindrical projection, a pressure coil spring surrounding the temperature sensing element, the spring having a proximal end and a distal end, and a sustaining element held in the transverse slots formed in each of the legs, the sustaining element supporting the distal end of the pressure coil spring.

2. The integrated thermostat as recited in claim 1, further comprising a filament affixed to the casing for retaining the ball-valve in the ball-valve seat.

3. The integrated thermostat as recited in claim 1, wherein the coupling flange has a base around the distal surface thereof, and further forms an annular channel around the base for receiving a sealing ring around the distal opening of the casing compartment.

4. The integrated thermostat as recited in claim 1, wherein the casing further includes a hole formed at the proximal portion of the compartment for installation of a deaeration valve an in fluid communication with the inlet conduit.

5. The integrated thermostat as recited in claim 1, wherein the legs extend to their distal ends at approximately 450° to an axial direction of the inlet conduit.

6. The integrated thermostat as recited in claim 1, wherein the two legs are diametrically opposed around the circumference of the compartment opening.

7. The integrated thermostat as recited in claim 1, wherein the distal end of the cylindrical projection includes an axial hole and a pin affixes the temperature sensing element to the distal end of the cylindrical projection, the pin being fixed to the proximal end of the temperature sensing element and disposed in the hole formed at the distal end of the cylindrical projection.

8. The integrated thermostat as recited in claim 1, wherein the temperature sensing element includes a peripheral tab formed at one end thereof, for sealing the distal opening of the compartment to provide liquid passage control through the compartment.

9. The integrated thermostat as recited in claim 8, wherein the peripheral tab is made of rubber.

* * * * *